(12) United States Patent
Ikeuchi et al.

(10) Patent No.: US 9,978,999 B2
(45) Date of Patent: May 22, 2018

(54) VEHICLE

(71) Applicant: HONDA MOTOR CO., LTD., Tokyo (JP)

(72) Inventors: Toshiyuki Ikeuchi, Wako (JP); Shin Shigeoka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days. days.

(21) Appl. No.: 15/522,066

(22) PCT Filed: Jun. 10, 2015

(86) PCT No.: PCT/JP2015/066719
 § 371 (c)(1),
 (2) Date: Apr. 26, 2017

(87) PCT Pub. No.: WO2016/067670
 PCT Pub. Date: May 6, 2016

(65) Prior Publication Data
 US 2017/0358786 A1 Dec. 14, 2017

(30) Foreign Application Priority Data

Oct. 27, 2014 (JP) .................................. 2014-218468

(51) Int. Cl.
 *H01M 2/10* (2006.01)
 *B60K 1/04* (2006.01)
 (Continued)

(52) U.S. Cl.
 CPC ............. *H01M 2/1083* (2013.01); *B60K 1/04* (2013.01); *B60L 11/1877* (2013.01);
 (Continued)

(58) Field of Classification Search
 CPC .......... H01M 2220/20; H01M 2/1083; H01M 10/613; H01M 10/625; B60K 1/04;
 (Continued)

(56) References Cited

U.S. PATENT DOCUMENTS 7,900,728 B2 * 3/2011 Suzuki ................... B60K 1/04
 180/65.29
2007/0284167 A1 * 12/2007 Watanabe ............. B60L 3/0046
 180/68.5
(Continued)

FOREIGN PATENT DOCUMENTS

JP 2007-290616 11/2007
JP 2008-152956 A 7/2008
(Continued)

OTHER PUBLICATIONS

International Search Report dated Jul. 28, 2015, issued in counterpart International Application No. PCT/JP2015/066719 (1 page).

*Primary Examiner* — Erez Gurari
(74) *Attorney, Agent, or Firm* — Westerman, Hattori, Daniels & Adrian, LLP

(57) ABSTRACT

A vehicle can be provided in which a rear surface of a center console (30) which accommodates an electric device (D) is formed by a detachable cover member (57), and a maintenance and inspection switch (61) for the electric device (D) is provided in a space defined between the electric device (D) accommodated in the center console (30) and the cover member (57), whereby an easy access to the maintenance and inspection switch (61) for the electric device (D) accommodated in the center console (30) can be gained.

7 Claims, 8 Drawing Sheets

(51) Int. Cl.
  *B60L 11/18* (2006.01)
  *H01M 10/625* (2014.01)
  *H01M 10/613* (2014.01)
  *B60R 7/04* (2006.01)
(52) U.S. Cl.
  CPC ....... *H01M 10/613* (2015.04); *H01M 10/625* (2015.04); *B60K 2001/0427* (2013.01); *B60L 11/1874* (2013.01); *B60L 2210/10* (2013.01); *B60R 7/04* (2013.01); *H01M 2220/20* (2013.01)
(58) Field of Classification Search
  CPC ......... B60K 2001/0427; B60L 11/1877; B60L 11/1874; B60L 2210/10
  See application file for complete search history.

(56) References Cited

U.S. PATENT DOCUMENTS

| | | | | |
|---|---|---|---|---|
| 2008/0047767 | A1* | 2/2008 | Tsuchiya | H01M 2/1072 180/68.5 |
| 2008/0315629 | A1* | 12/2008 | Abe | B62D 21/157 296/193.07 |
| 2009/0183935 | A1* | 7/2009 | Tsuchiya | B60K 1/04 180/68.1 |
| 2010/0001553 | A1* | 1/2010 | Yoda | B60K 1/04 296/193.07 |
| 2010/0071980 | A1* | 3/2010 | Kokaji | B60H 1/00278 180/68.5 |
| 2010/0089675 | A1* | 4/2010 | Nagata | B60K 1/04 180/68.5 |
| 2010/0213741 | A1* | 8/2010 | Suzuki | B60K 1/04 296/193.07 |
| 2010/0231035 | A1* | 9/2010 | Tsuchiya | B60H 1/00278 307/9.1 |
| 2010/0244489 | A1* | 9/2010 | Shiono | B60N 2/4235 296/193.01 |
| 2011/0132676 | A1* | 6/2011 | Kodaira | B60K 1/04 180/65.51 |
| 2012/0015257 | A1* | 1/2012 | Arisawa | B60K 1/04 429/400 |
| 2012/0118653 | A1* | 5/2012 | Ogihara | B60K 1/04 180/65.8 |
| 2013/0140101 | A1* | 6/2013 | Lim | B60K 1/04 180/68.5 |
| 2014/0345961 | A1* | 11/2014 | Kimura | B60K 1/04 180/68.5 |
| 2015/0010795 | A1* | 1/2015 | Tanigaki | H01M 10/625 429/83 |
| 2017/0320383 | A1* | 11/2017 | Ikeuchi | B60K 1/04 |
| 2018/0022186 | A1* | 1/2018 | Gaboury | B60H 1/00278 |

FOREIGN PATENT DOCUMENTS

| | | |
|---|---|---|
| JP | 2009-119890 A | 6/2009 |
| JP | 2013-171662 A | 9/2013 |

* cited by examiner

VEHICLE

TECHNICAL FIELD

The present invention relates to a vehicle, and more particularly to a vehicle in which a center console which accommodates therein an electric device is disposed between front seats.

BACKGROUND ART

In a hybrid electric vehicle or an electric vehicle, a high-voltage battery is mounted as a drive source for an electric motor. In recent years, it has been under study to dispose a high-voltage battery within a passenger compartment, and battery installation mechanisms have been proposed in which a high-voltage battery is disposed between a pair of seats which are aligned side by side in a left-right or transverse direction of a vehicle (for example, refer to patent literatures 1, 2).

Patent literature 1 discloses a battery system which enables a safety plug to be disposed within a small space by disposing the safety plug on a surface of an electric accessory which lies opposite to a side where an intake duct is disposed. In addition, patent literature 2 discloses a high-voltage cable connecting construction in which a battery pack is provided in a middle area of an interior of a passenger compartment and a terminal table and a service plug are disposed further forwards than a front end of the battery pack, whereby the battery pack is connected to an inverter placed within an engine compartment by a high-voltage cable via the terminal table.

RELATED ART LITERATURE

Patent Literature

Patent Literature 1: JP-A-2008-152956
Patent Literature 2: JP-A-2007-290616

SUMMARY OF THE INVENTION

Problem that the Invention is to Solve

Patent literature 1 discloses the configuration in which the battery system including the safety plug is disposed under the seat, and therefore, it is not possible to gain easy access to the safety plug in performing maintenance work. In patent literature 2, the service plug is disposed further forwards than the front end of the battery pack, and therefore, in performing maintenance work, the maintenance work has to be carried out within a narrow space ahead of the front seats, and it is not easy to gain access to the service plug.

The present invention provides a vehicle which can gain easy access to a maintenance and inspection switch for an electric device accommodated in a center console.

Means for Solving the Problem

The invention provides the following aspects.

According to a first aspect, there is provided a vehicle (for example, a vehicle 10 in an embodiment which will be described later) including:

an electric device (for example, an electric device D in the embodiment);

a pair of left and right front seats (for example, a left front seat 14L and a right front seat 14R in the embodiment); and a center console (for example, a center console 30 in the embodiment) which is disposed between the front seats and which accommodates the electric device, wherein a rear surface of the center console is formed by an detachable cover member (for example, a cover member 57 in the embodiment), and a maintenance and inspection switch (for example, a maintenance and inspection switch 61 in the embodiment) is provided in a space defined between the electric device accommodated in the center console and the cover member.

According to a second aspect, in the first aspect, the maintenance and inspection switch is disposed in the vicinity of a floor (for example, a floor panel 11 in the embodiment) of the vehicle.

According to a third aspect, in the second aspect, the maintenance and inspection switch is provided so as to extend rearwards while being inclined obliquely to either the left or the right.

According to a fourth aspect, in the first aspect, the cover member has an inclined surface (for example, an inclined surface 57a in the embodiment) which is inclined obliquely downwards from the front to the rear, an intake grille (for example, an intake grille 56 in the embodiment) configured to take in air inside a passenger compartment is formed in the inclined surface, an inner cover member (for example, a rear cover member 31B in the embodiment) which is inclined obliquely downwards from the front to the rear is provided above the maintenance and inspection switch, and an upper edge (an upper edge 31u in the embodiment) of the inner cover member is positioned further forwards than an upper edge (for example, an upper edge 56a in the embodiment) of the intake grille.

According to a fifth aspect, in the fourth aspect, the vehicle includes an intake duct (for example, an intake duct 37 in the embodiment) which is configured to guide air taken in from the intake grille towards the electric device, wherein an opening portion (for example, an opening portion 63 in the embodiment) of the intake duct faces the intake grille, an upper edge (for example, an upper edge 63a in the embodiment) of the opening portion lies adjacent to the upper edge of the intake grille, and a lower edge (for example, a lower edge 63b in the embodiment) of the opening portion is spaced away from a lower edge (for example, a lower edge 56b in the embodiment) of the intake grille and is positioned on an imaginary line (for example, an imaginary line VL in the embodiment) which is suspended downwards vertically from the upper edge of the intake grille.

According to a sixth aspect, in the fifth aspect, a hood portion (for example, a hood portion 64 in the embodiment) is provided over the opening portion so as to be inclined obliquely downwards from the front to the rear and cover part of the inner cover member, and a lower edge (for example, a lower edge 63b in the embodiment) of the hood portion is positioned further downwards than the lower edge of the intake grille.

According to a seventh aspect, in the fourth aspect, a foreign matter accommodating portion (for example, a foreign matter accommodating portion 65 in the embodiment) configured to accommodate a foreign matter which enters an interior of the center console from the intake grille is provided between the cover member and the inner cover member within the space.

Advantage of the Invention

According to the first aspect, the rear surface of the center console which accommodates the electric device is formed by the detachable cover member, and the maintenance and inspection switch is provided in the space defined between the electric device and the cover member. Therefore, in the event that the cover member on the rear surface of the center console is detached, it is possible to gain access to the maintenance and inspection switch from the rear of the center console. In this way, no work to remove the seats to gain access to the maintenance and inspection switch has to be performed, and therefore, it is possible to carry out the maintenance work for the electric device easily and efficiently.

According to the second aspect, the maintenance and inspection switch is disposed in the vicinity of the floor of the vehicle, and therefore, it is possible to gain easy access to the maintenance and inspection switch from a space defined at the feet of a passenger seated on a rear seat.

According to the third aspect, the maintenance and inspection switch is provided so as to extend rearwards while being inclined obliquely to either the left or the right. Therefore, it is possible to gain access to the maintenance and inspection switch from a position behind the center console which lies oblique to either the left or the right of the center console. In addition, in gaining access to the maintenance and inspection switch from the space at the feet of the passenger seated on the rear seat, the space at the feet of the rear seat passenger expands in a transverse direction of the vehicle. Therefore, it is easy to gain access to the maintenance and inspection switch which extends rearwards while being inclined obliquely to either the left or the right.

According to the fourth aspect, the intake grille is formed in the inclined surface of the cover member. Therefore, the intake grille can be disposed while suppressing the protrusion of the cover member into the interior of the passenger compartment. In addition, the inner cover member which is inclined obliquely downwards from the front to the rear is provided above the maintenance and inspection switch. Therefore, foreign matter such as water, dust and the like which enters from the intake grille can be received by the inner cover member to prevent the intrusion of foreign matter into the area where the maintenance and inspection switch is provided.

According to the fifth aspect, the upper edge of the opening portion of the intake duct which faces the intake grille lies adjacent to the upper edge of the intake grille, the lower edge of the opening portion is spaced away from the lower edge of the intake grille, and the lower edge of the opening portion is positioned on the imaginary line which is suspended downwards vertically from the upper edge of the intake grille. Therefore, foreign matter such as water, dust and the like which enters from the intake grille can be received by at least the opening portion of the intake duct to prevent the intrusion of foreign matters into an intake air flow path in the intake duct.

According to the sixth aspect, the hood portion which is provided over the opening portion of the intake duct is inclined obliquely downwards from the front to the rear so as to cover part of the inner cover member, and the lower edge of the hood portion is positioned further downwards than the lower edge of the intake grille. Therefore, foreign matter such as water, dust and the like which enters from the intake grille is received by the hood portion, thereby making it possible to prevent the intrusion of foreign matter into the intake air flow path in the intake duct.

According to the seventh aspect, the foreign matter such as water, dust and the like which enters from the intake grille to be received by the inner cover member, the opening portion of the intake duct and the hood portion of the opening portion falls into the foreign matter accommodating portion defined between the cover member and the inner cover member. The foreign matter accommodating portion is the space provided between the cover member and the inner cover member within the center console, and therefore, a space for accommodating foreign matter does not have to be formed separately, thereby making it possible to reduce the number parts involved.

MODE FOR CARRYING OUT THE INVENTION

Figure 1:
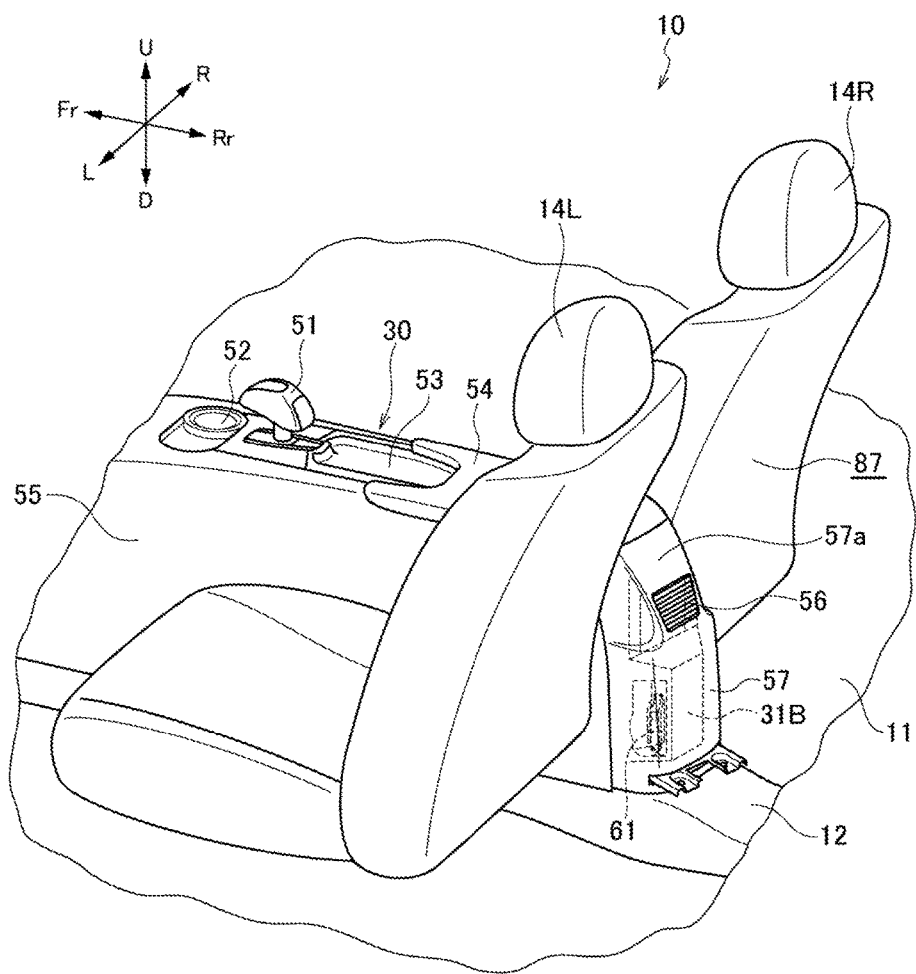
FIG. 1 is a perspective view showing front seats and a center console which is disposed between the front seats of a vehicle according to an embodiment of the invention.

Hereinafter, one embodiment of the invention will be described by reference to the drawings. The drawings should be seen in a direction in which given reference numerals look properly. In the following description, front, rear, left, right, up and down denote accordingly directions as seen from a driver of a vehicle. The front, rear, left, right, up and down of the vehicle are denoted by Fr, Rr, L, R, U and D, respectively.

Figure 2:
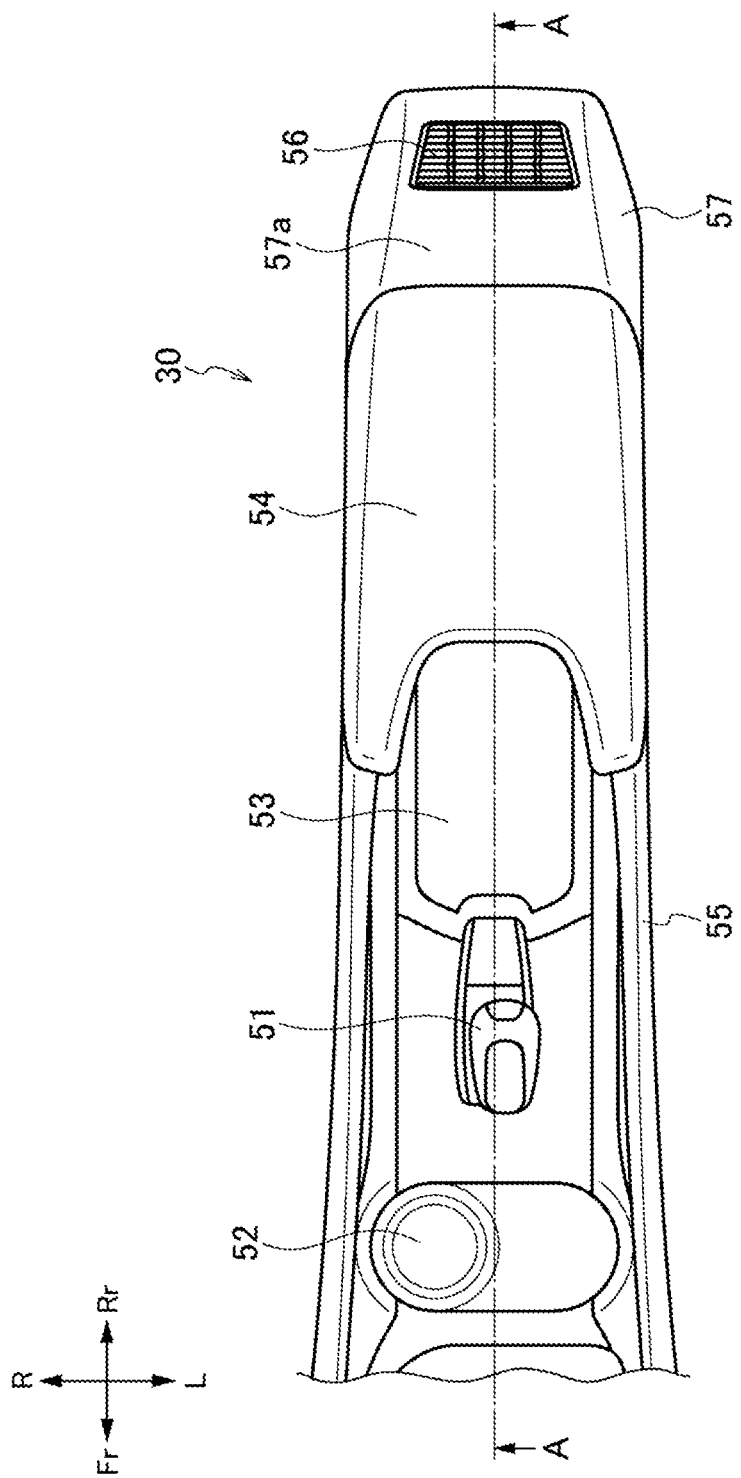
FIG. 2 is a plan view of the center console.
Figure 3:
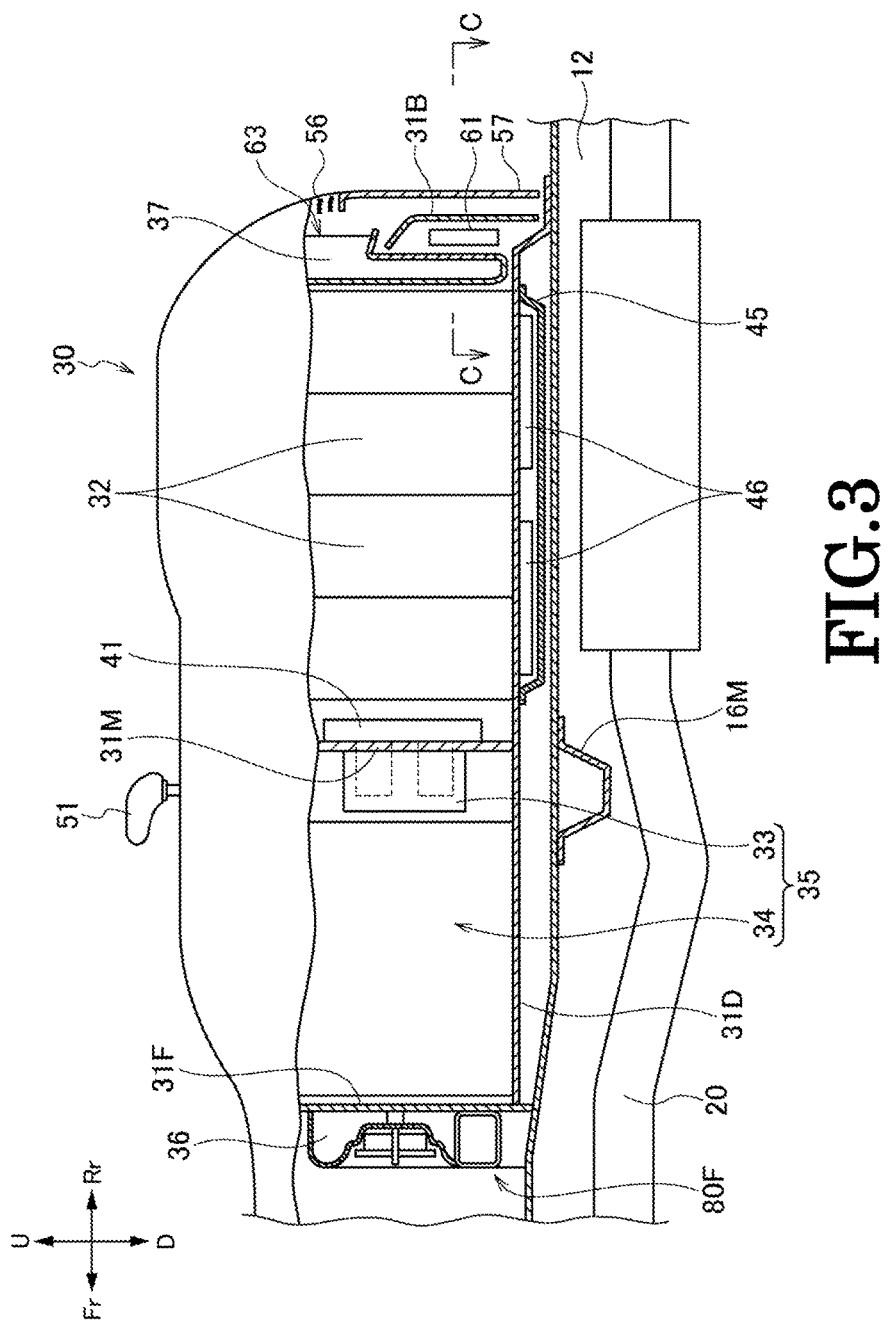
FIG. 3 is a partial sectional view taken along a line A-A in FIG. 2.

FIG. 1 is a perspective view showing front seats and a center console which is disposed between the front seats of a vehicle according to an embodiment of the invention, FIG. 2 is a plan view of the center console, and FIG. 3 is a partial sectional view of the center console.

As shown in FIGS. 1 to 3, in a vehicle 10 of this embodiment, a center console 30 is disposed over a center tunnel 12 formed on a floor panel 11, and an electric device D is accommodated in the center console 30.

<Center Console>

The center console 30 is disposed between a left front seat 14L and a right front seat 14R, and an interior space thereof is covered by an external cover 55 on an upper surface of which a cup holder 52, a shift knob 51, a small article accommodating tray 53 and an armrest 54 for a driver and a front seat passenger are provided sequentially in that order from the front. A detachable cover member 57 is attached to a rear end of the external cover 55. The cover member 57 has an inclined surface 57a which is inclined obliquely downwards from the front to the rear, and an intake grille 56 is formed in this inclined surface 57a. The intake grille 56 takes in air inside a passenger compartment 87 as cooling air for the electric device D when a cooling fan 36, which will be described later, is activated to operate.

<Electric Device>

Figure 4:
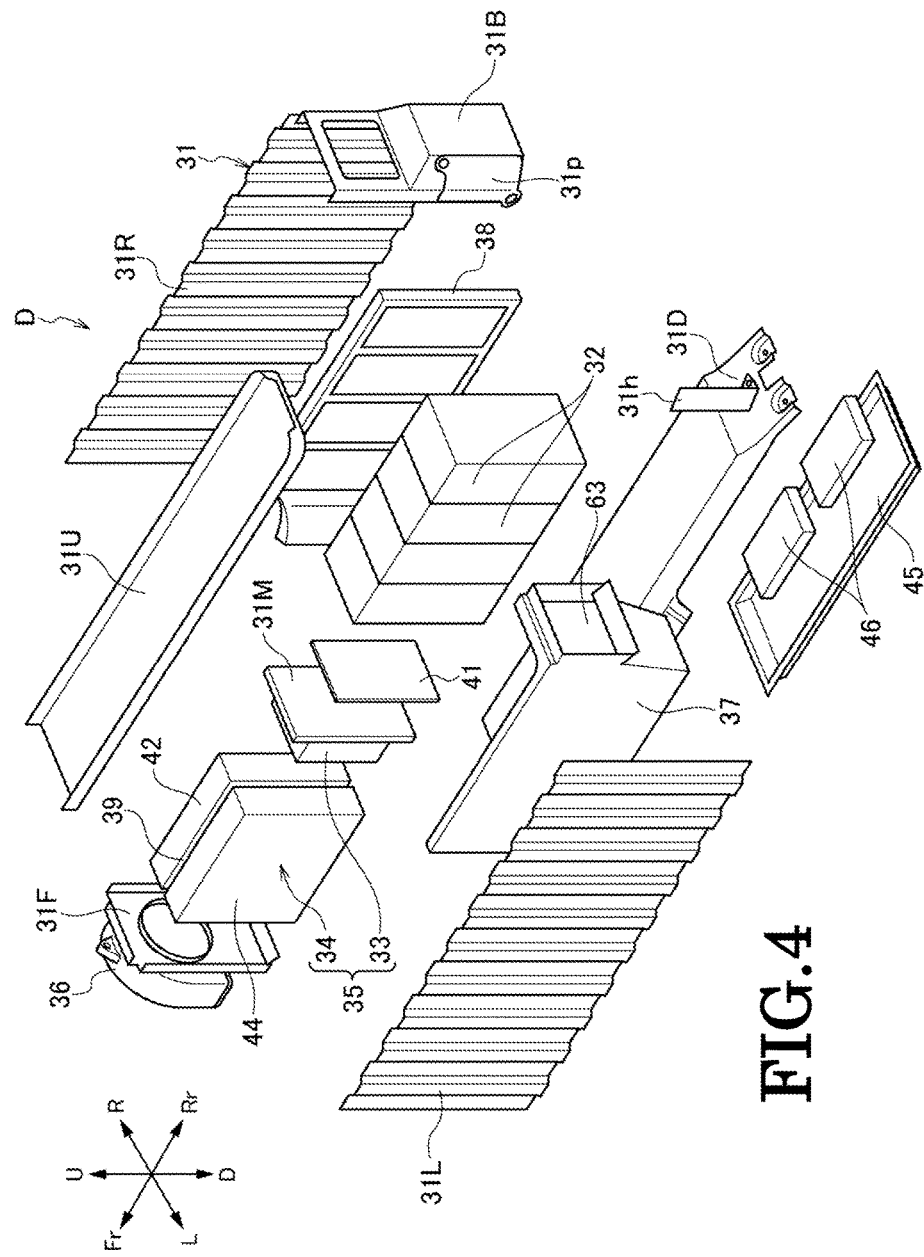
FIG. 4 is an exploded perspective view of an electric device accommodated in the center console.

Next, the electric device D accommodated in the center console 30 will be described by reference to FIGS. 3 and 4. FIG. 4 is an exploded perspective view of the electric device D.

The electric device D includes high-voltage batteries 32, an ECU 41, and high-voltage system equipment 35, and these high-voltage batteries 32, ECU 41 and high-voltage system equipment 35 are made into a unit by being supported by a frame member 31. The frame member 31 is made up as a result of an upper frame member 31U, a lower frame member 31D, and a middle frame member 31M which joins the upper frame member 31U and the lower frame member 31D together being surrounded by a front cover member 31F, a left cover member 31L, a right cover member 31R and a rear cover member 31B.

The high-voltage batteries 32, the ECU 41 and the high-voltage equipment 35 are disposed sequentially in this order from the rear of the vehicle. The high-voltage system equipment 35 includes a junction box 33 which is attached to a front surface of the middle frame member 31M and a converter (PCU) 34 which is disposed ahead of the junction box 33 to convert the voltages of the high-voltage batteries 32. The ECU 41 described above is attached to a rear surface of the middle frame member 31M. The converter (PCU) 34 includes a DC-DC converter 42 and an inverter 44, and these DC-DC converter 42 and inverter 44 are disposed transversely side by side in a space defined between the front cover member 31F and the junction box 33.

An intake duct 37 is attached to left side surfaces of the high-voltage batteries 32 to be disposed between the high-voltage batteries 32 and the left cover member 31L, and an exhaust duct 38 is attached to right side surfaces of the high-voltage batteries 32 to be disposed between the high-voltage batteries 32 and the left cover member 31L. Cell voltage sensors (CVS) 46 are fixed to a lower surface of the lower frame member 31D and are covered by a CVS cover 45. The electric device D is fixed to the center tunnel 12 as a result of the lower frame member 31D being fastened to the center tunnel 12 with bolts. The cooling fan 36 is attached to the front surface of the front cover member 31F. Air taken in from the intake grille 56 of the center console 30 by the cooling fan 36 passes sequentially through the intake duct 37, the high-voltage batteries 32, and the exhaust duct 38 in that order, then passes from the exhaust duct 38 through a cooling passageway 39 formed between the DC-DC converter 42 and the inverter 44, and is then sucked by the cooling fan 36 to be discharged into an exhaust air flow path 80F from the cooling fan 36. The exhaust air flow path 80F is a flow path which discharges cooling air discharged from the cooling fan 36 into the passenger compartment 87 through a side trim. Since the exhaust air flow path 80F is not related directly to the invention, the detailed description thereof will be omitted here.

<Construction of Rear Portion of Center Console>

Figure 5A:
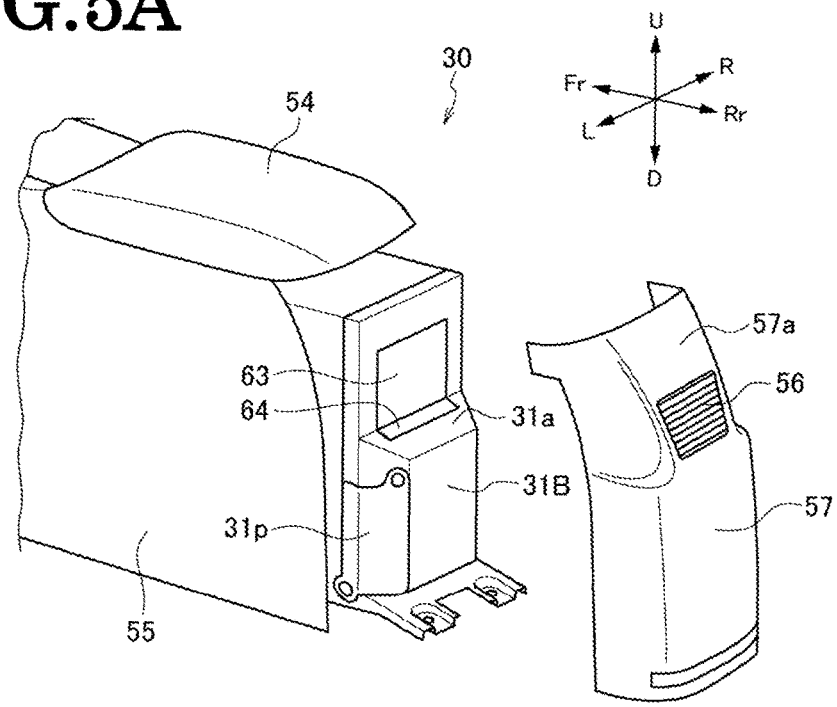
FIG. 5A is a perspective view of a rear portion of the center console with a cover member on a rear surface of the center console removed.
Figure 5B:
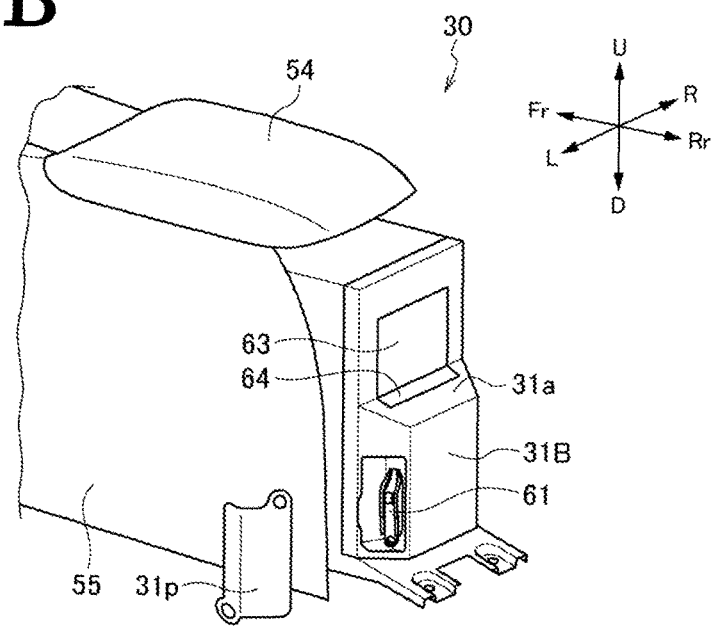
FIG. 5B is a perspective view of the rear portion of the center console with a lid of the rear cover member removed further.

Next, the construction of a rear portion of the center console 30 will be described by reference to FIGS. 5A, 5B to 7. FIG. 5A is a perspective view showing the rear portion of the center console 30 with the cover member 57 on the rear surface of the center console 30 removed, FIG. 5B is a perspective view showing the rear portion of the center console 30 with a lid 31p of the rear cover member 31B removed further, FIG. 6 is an enlarged sectional view of the rear portion of the center console 30, and FIG. 7 is a sectional view taken along a line C-C in FIG. 3.

A maintenance and inspection switch 61 which extends rearwards while being inclined obliquely to the left is provided in the vicinity of the floor panel 11 of the vehicle 10 in a space defined between the detachable cover member 57 attached to the rear portion of the center console 30 and the electric device D. The maintenance and inspection switch 61 is a device configured to shut off circuits between the high-voltage batteries 32 and the electric device D so as to allow maintenance work to be performed safely on the electric device D when such maintenance work is required.

The maintenance and inspection switch 61 is held by a switch holding member 31h which is provided at a rear end of the lower frame member 31D and is covered further by the rear cover member 31B which is provided inside the cover member 57. When operating the maintenance and inspection switch 61, removing the lid 31p which covers partially an opening in the rear cover member 31B can access to the maintenance and inspection switch 61. The rear cover member 31B has a pent roof portion 31a which is inclined obliquely downwards from the front to the rear and covers over the maintenance and inspection switch 61. As shown in FIG. 6, an upper edge 31u of the pent roof portion 31a is positioned further forwards than an upper edge 56a of the intake grille 56.

Figure 6:
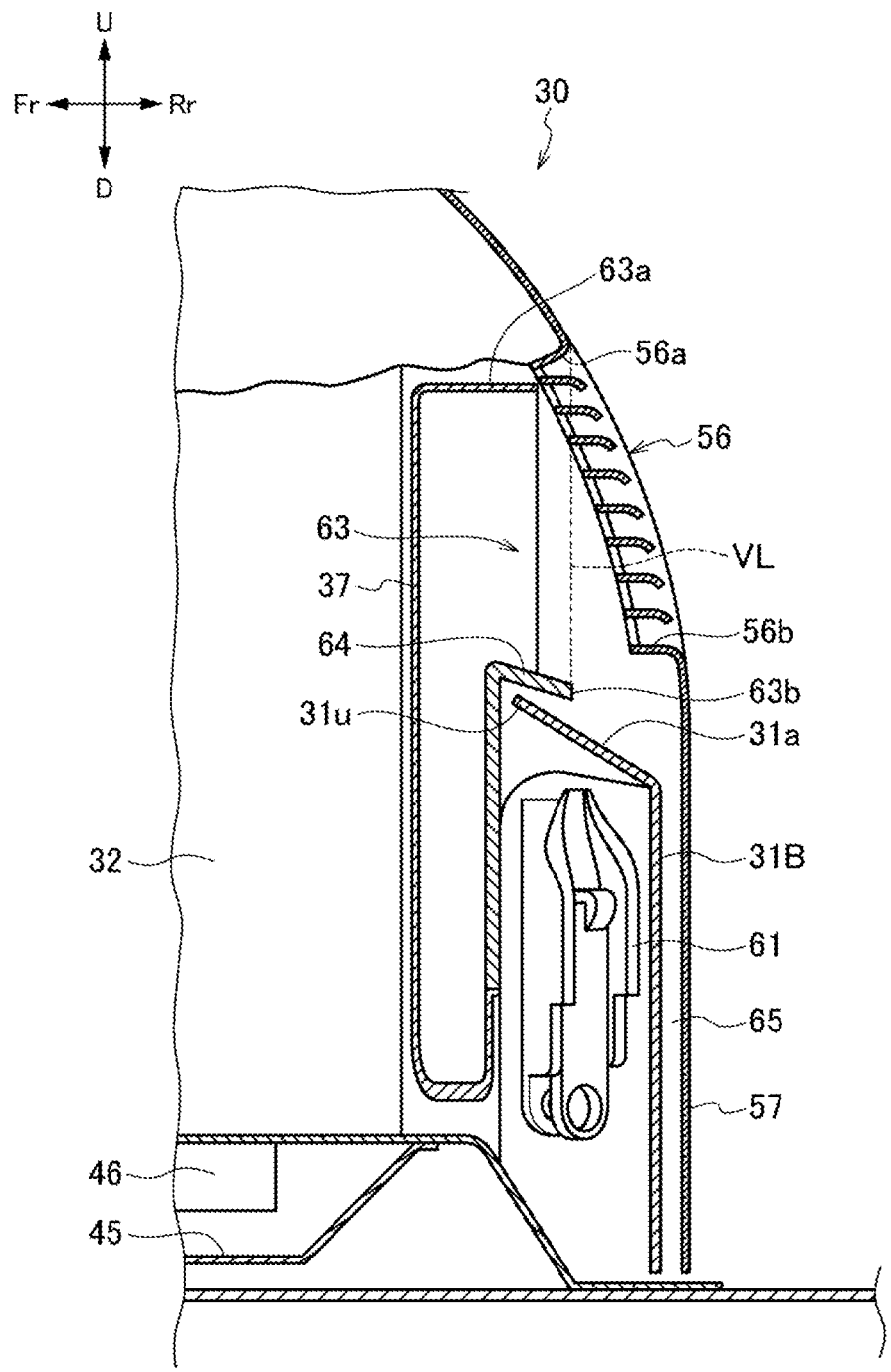
FIG. 6 is an enlarged sectional view of the rear portion of the center console.
Figure 7:
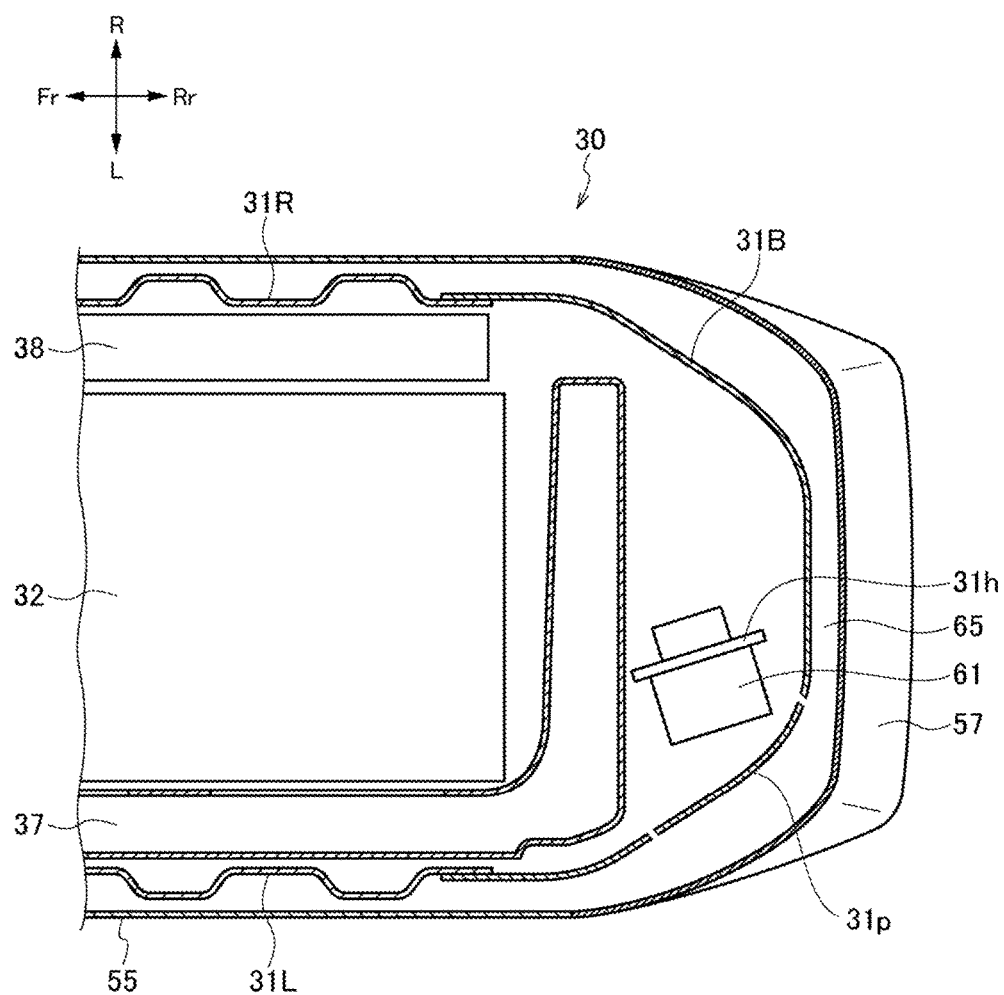
FIG. 7 is a partial sectional view taken along a line C-C in FIG. 3.

As shown in FIG. 6, the intake duct 37 is disposed so that an opening portion 63 thereof faces the intake grille 56, and an upper edge 63a of the opening portion 63 lies adjacent to the upper edge 56a of the intake grille 56. A lower edge 63b of the opening portion 63 is spaced away from the lower edge 56b of the intake grille 56 and is positioned on an imaginary line VL which is suspended downwards vertically from the upper edge 56a of the intake grille 56. A hood portion 64 is provided in the opening portion 63 of the intake duct 37, and this hood portion 64 is inclined obliquely downwards from the front to the rear to cover part of the rear cover member 31B. A lower edge of the hood portion 64, which also constitutes a lower edge 63b of the opening portion 63, is positioned lower than a lower edge 56b of the intake grille 56.

There may be a risk of foreign matter such as water, dust, a coin and a clip entering from the intake grille 56 which is formed in the inclined surface 57a of the cover member 57 so as to be opened obliquely upwards. However, the lower edge 63b of the opening portion 63 is positioned directly below the upper edge 56a of the intake grille 56, and further, the upper edge 31u of the pent roof portion 31a of the rear cover member 31B is positioned further forwards than the upper edge 56a of the intake grille 56. Therefore, foreign matter entering an interior of the cover member 57 from the intake grille 56 is caught by the hood portion 64 and further by the pent roof portion 31a of the rear cover member 31B. Since both the hood portion 64 and the pent roof portion 31b are inclined obliquely downwards from the front to the rear, the foreign matter falls downwards. The foreign matter that falls downwards is accommodated in a foreign matter accommodating portion 65 which is a space defined between the cover member 57 and the rear cover member 31B within the center console 30.

Figure 8:
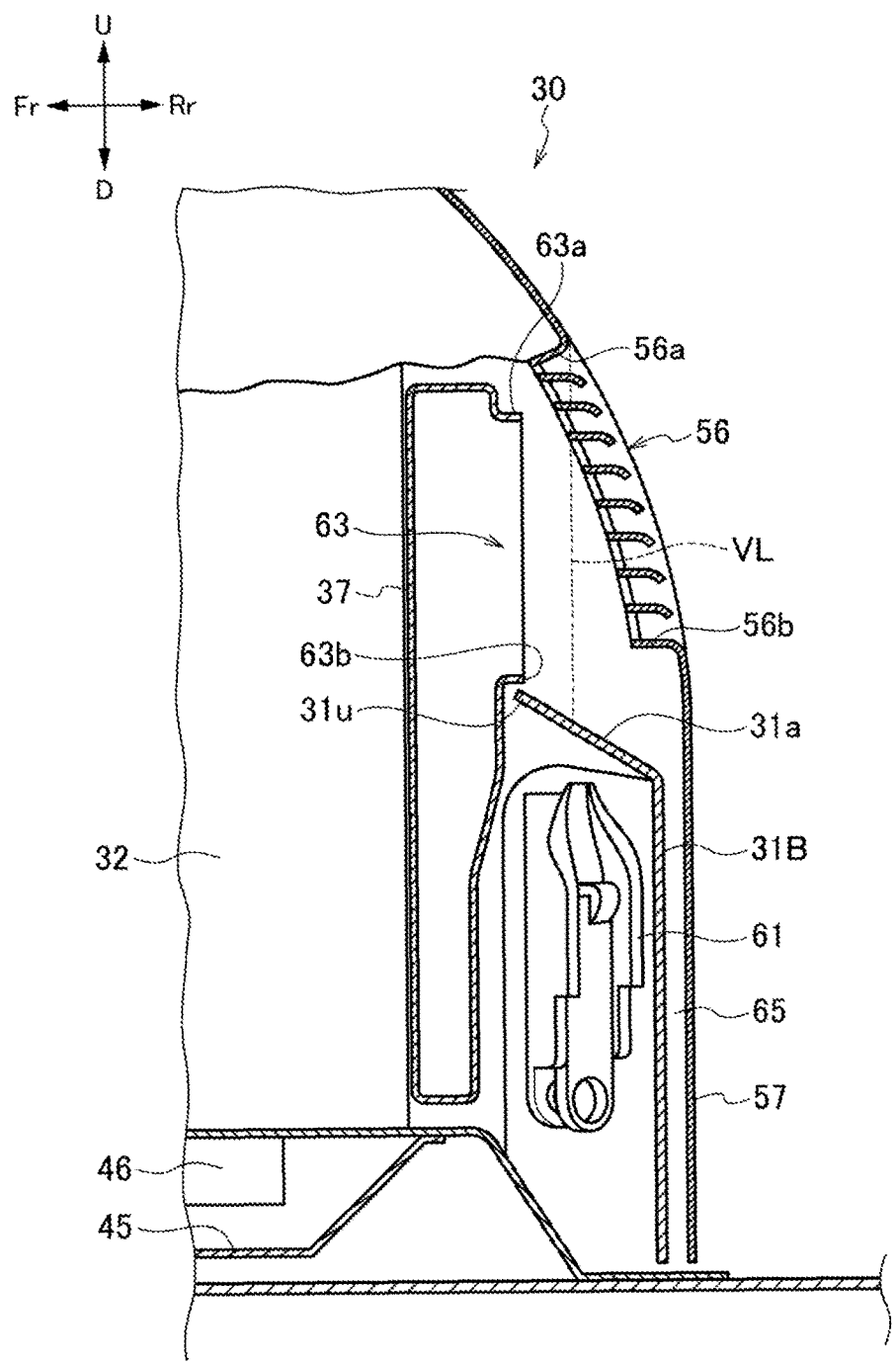
FIG. 8 is an enlarged sectional view of a rear portion of a center console according to a modified example.

A construction of the rear portion of the center console according to a modified example will be described by reference to FIG. 8. In a center console according a modified example, a lower edge 63b of an opening portion 63 of an intake duct 37 is positioned further forwards than an imaginary line VL which is suspended vertically downwards from an upper edge 56a of an intake grille 56 but is positioned further forwards than an upper edge 31u of a pent roof portion 31a of a rear cover member 31B. Owing to this, foreign matter entering an interior of a cover member 57 from the intake grille 56 is caught by the pent roof portion 31a of the rear cover member 31B. The construction other than the construction described above of the rear portion of the center console 30 according to the modified example is similar to that of the rear portion of the center console 30 according to the embodiment described above, and hence, in FIG. 8, like reference numerals are given to like constituent elements to those shown in FIG. 6. Therefore, like or corresponding reference numerals are given to like or similar portions to those of the vehicle according to the embodiment, and the description thereof will be simplified or omitted.

Thus, as has been described heretofore, according to the vehicle 10 of this embodiment, the rear surface of the center console 30 which accommodates the electric device D is formed by the detachable cover member 57, and the maintenance and inspection switch 61 is provided in the space defined between the electric device D and the cover member 57. Therefore, in the event that the lid 31p is removed after the cover member 57 on the rear surface of the center console 30 is detached, it is possible to gain access to the maintenance and inspection switch 61 from the rear of the center console 30. In this way, no work to remove the left front seat 14L and the right front seat 14R to gain access to the maintenance and inspection switch 61 has to be performed, and therefore, it is possible to carry out the maintenance work for the electric device D easily and efficiently.

Additionally, the maintenance and inspection switch 61 is disposed in the vicinity of the floor panel 11 of the vehicle 10, and therefore, it is possible to gain easy access to the maintenance and inspection switch 61 from the space defined at the feet of a passenger seated on a rear seat (not shown) which is placed at the rear of the left front seat 14L and the right front seat 14R.

Further, the maintenance and inspection switch 61 is provided so as to extend rearwards while being inclined obliquely to the left. Therefore, it is possible to gain access to the maintenance and inspection switch 61 from a position behind the center console 30 which lies oblique to the left of the center console 30. In addition, in gaining access to the maintenance and inspection switch 61 from the space at the feet of the passenger seated on the rear seat, the space at the feet of the rear seat passenger expands in a transverse direction of the vehicle 10. Therefore, it is easy to gain access to the maintenance and inspection switch 61 which extends rearwards while being inclined obliquely to the left.

The intake grille 56 is formed in the inclined surface 57a of the cover member 57. Therefore, the intake grille 56 can be disposed while suppressing the protrusion of the cover member 57 into the interior of the passenger compartment 87. In addition, the rear cover member 31B having the pent roof portion 31a which is inclined obliquely downwards from the front to the rear is provided above the maintenance and inspection switch 61. Therefore, foreign matter such as water, dust, a coin, a clip and the like which enters from the intake grille 56 can be received by the rear cover member 31B to prevent the intrusion of foreign matter into the area where the maintenance and inspection switch 61 is provided.

Additionally, the upper edge 63a of the opening portion 63 of the intake duct 37 which faces the intake grille 56 lies adjacent to the upper edge 56a of the intake grille 56, the lower edge 63b of the opening portion 63 is spaced away from the lower edge 56b of the intake grille 56, and the lower edge 63b of the opening portion 63 is positioned on the imaginary line VL which is suspended downwards vertically from the upper edge 56a of the intake grille 56. Therefore, foreign matters such as water, dust, a coin, a clip and the like which enters from the intake grille 56 can be received by at least the opening portion 63 of the intake duct 37 to prevent the intrusion of foreign matter into an intake air flow path in the intake duct 37.

Further, the hood portion 64 which is provided over the opening portion 63 of the intake duct 37 is inclined obliquely downwards from the front to the rear so as to cover part of the rear cover member 31B, and the lower edge of the hood portion 64, which also constitutes the lower edge 63b of the opening portion 63, is positioned further downwards than the lower edge 56b of the intake grille 56. Therefore, foreign matter such as water, dust, a coin, a clip and the like which enters from the intake grille 56 are received by the hood portion 64, thereby making it possible to prevent the intrusion of foreign matter into the intake air flow path in the intake duct 37.

In addition, the foreign matter such as water, dust, a coin, a clip and the like which enters from the intake grille 56 to be received by the rear cover member 31B, the opening portion 63 of the intake duct 37 and the hood portion 64 of the opening portion 63 falls into the foreign matter accommodating portion 65 defined between the rear cover member 31B and the cover member 57. The foreign matter accommodating portion 65 is the space provided between the rear cover member 31B and the cover member 57 within the center console 30, and therefore, a space for accommodating foreign matter does not have to be formed separately, thereby making it possible to reduce the number parts involved.

The invention is not limited to the embodiment that has been described above and hence can be modified or improved as required. For example, the center tunnel 12 may be formed only by the floor panel 11 or an integral formed product in which the floor panel 11 is covered by a center tunnel cover.

This patent application is based on the Japanese Patent Application (No. 2014-218468) filed on Oct. 27, 2014, the contents of which are incorporated herein by reference.

DESCRIPTION OF REFERENCE NUMERALS AND CHARACTERS 10 vehicle
11 floor panel (floor)
12 center tunnel
14L left front seat (front seat)
14R right front seat (front seat)
30 center console
31B rear cover member
32 high-voltage battery
35 high-voltage system equipment
37 intake duct
56 intake grille
56a upper edge of intake grille
56b lower edge of intake grille
57 cover member
57a inclined surface
61 maintenance and inspection switch
31u upper edge of pent roof portion of rear cover member
63 opening portion
63a upper edge of opening portion
63b lower edge of opening portion
64 hood portion
65 foreign matter accommodating portion
D electric device
VL imaginary line

The invention claimed is:

1. A vehicle, comprising:
   an electric device;
   a pair of left and right front seats; and
   a center console which is disposed between the front seats and which accommodates the electric device,
   wherein a rear surface of the center console is formed by an detachable cover member, and
   a maintenance and inspection switch is provided in a space defined between the electric device accommodated in the center console and the cover member.

2. The vehicle according to claim 1,
   wherein the maintenance and inspection switch is disposed in the vicinity of a floor of the vehicle.

3. The vehicle according to claim 1,
   wherein the maintenance and inspection switch is provided so as to extend rearwards while being inclined obliquely to either the left or the right.

4. The vehicle according to claim 1,
   wherein the cover member has an inclined surface which is inclined obliquely downwards from the front to the rear,
   an intake grille configured to take in air inside a passenger compartment is formed in the inclined surface,
   an inner cover member which is inclined obliquely downwards from the front to the rear is provided above the maintenance and inspection switch, and
   an upper edge of the inner cover member is positioned further forwards than an upper edge of the intake grille.

5. The vehicle according to claim 4, comprising:
   an intake duct which is configured to guide air taken in from the intake grille towards the electric device,
   wherein an opening portion of the intake duct faces the intake grille,
   an upper edge of the opening portion lies adjacent to the upper edge of the intake grille, and
   a lower edge of the opening portion is spaced away from a lower edge of the intake grille and is positioned on an imaginary line which is suspended downwards vertically from the upper edge of the intake grille.

6. The vehicle according to claim 5,
   wherein a hood portion is provided over the opening portion so as to be inclined obliquely downwards from the front to the rear and cover part of the inner cover member, and
   a lower edge of the hood portion is positioned further downwards than the lower edge of the intake grille.

7. The vehicle according to claim 4,
   wherein a foreign matter accommodating portion configured to accommodate foreign matter which enters an interior of the center console from the intake grille is provided between the cover member and the inner cover member within the space.

* * * * *